(12) United States Patent
Delius et al.

(10) Patent No.: US 6,194,040 B1
(45) Date of Patent: Feb. 27, 2001

(54) MULTILAYERED, BIAXIALLY-ORIENTED FOOD CASING COMPRISING TWO OXYGEN-BARRIER LAYERS

(75) Inventors: Ulrich Delius, Frankfurt; Karl Stenger, Ruedesheim; Gerhard Grolig, Moerfelden-Walldorf, all of (DE)

(73) Assignee: Kalle Nalo GmbH & Co. KG, Wiesbaden (DE)

( * ) Notice: Subject to any disclaimer, the term of this patent is extended or adjusted under 35 U.S.C. 154(b) by 0 days.

(21) Appl. No.: 09/072,185

(22) Filed: May 5, 1998

(30) Foreign Application Priority Data

May 21, 1997 (DE) .............................. 197 21 142

(51) Int. Cl.⁷ .............................. A22C 13/00; B32B 27/08
(52) U.S. Cl. .................. 428/34.8; 138/118.1; 426/105; 426/129; 426/138; 426/277; 264/514
(58) Field of Search .......... 428/34.8; 138/118.1; 206/802; 426/105, 129, 138, 277; 264/514

(56) References Cited

U.S. PATENT DOCUMENTS

| 4,486,507 | 12/1984 | Schumacher | 428/476.1 |
|---|---|---|---|
| 5,185,189 | 2/1993 | Stenger et al. | 428/34.8 |
| 5,356,676 | 10/1994 | Widdern et al. | 428/34.8 |
| 5,399,427 | * 3/1995 | Stenger et al. | 428/34.8 |
| 5,425,974 | * 6/1995 | Von Widdern et al. | 428/354 |
| 5,480,690 | * 1/1996 | Stenger et al. | 428/34.8 |
| 5,612,104 | 3/1997 | Grund | 428/348 |
| 5,747,124 | 5/1998 | Pophusen et al. | 428/34.8 |

FOREIGN PATENT DOCUMENTS

| 4339 337A1 | 3/1995 | (DE) . |
|---|---|---|
| 195 29 603 | 2/1997 | (DE) . |
| 0065 278 | 11/1982 | (EP) . |
| 467039 | * 1/1992 | (EP) . |
| 0 467 039 | 1/1992 | (EP) . |
| 0467 039 | 1/1992 | (EP) . |
| 0 530 549 | 3/1993 | (EP) . |
| 0 530539 | * 3/1993 | (EP) . |
| 0 589 436 A1 | 3/1994 | (EP) . |
| 0589 431 | 3/1994 | (EP) . |
| 0 603 676 | 6/1994 | (EP) . |
| 603 676 A1 | 6/1994 | (EP) . |
| 0 658 310 | 6/1995 | (EP) . |

OTHER PUBLICATIONS

Koros, "Barrier Polymers and Structures" A C S Symposium Series 423 *A. Chem. Soc.* pp. 192–202 (1990).

Rellmann et al., "Barrieremedien" *Lagebericht* pp. 729–738 (1992).

* cited by examiner

*Primary Examiner*—Rena L. Dye
(74) *Attorney, Agent, or Firm*—Foley & Lardner

(57) ABSTRACT

An at least four-layer tubular biaxially oriented food casing having an outer layer which includes a mixture of at least one aliphatic and at least one partly aromatic (co)polyamide with or without pigments, and an inner layer which includes aliphatic (co)polyamide, wherein, between these layers, a layer of an ethylene/vinyl alcohol copolymer or a blend of the ethylene/vinyl alcohol copolymer with an aliphatic or partly aromatic (co)polyamide and/or with an olefinic (co)polymer and/or an ionomer resin and a layer of an olefinic (co)polymer with or without adhesion promoters, pigments, and/or UV absorbers are arranged. The casing has a high water-vapor and oxygen barrier. It is particularly suitable as synthetic sausage casing, and can also be used for packaging cheese or animal feed.

20 Claims, No Drawings

MULTILAYERED, BIAXIALLY-ORIENTED FOOD CASING COMPRISING TWO OXYGEN-BARRIER LAYERS

BACKGROUND OF THE INVENTION

1. Field of the Invention

The invention relates to a multilayered, biaxially oriented, food casing made of thermoplastics, and to processes for its production and use.

2. Description Related Art

Food casings of the type mentioned above are used, in particular, for producing cooked-meat sausage and scalded-emulsion sausage. In general, the longest possible storage life of the sausage is sought. Casings have been developed which have a decreased permeability to water vapor and/or oxygen. A water vapor barrier prevents drying out during storage and an oxygen barrier prevents oxidation of the sausage emulsion. An increasing gray coloration of the emulsion surface indicates oxidation which causes the gradual spoilage of the sausage.

Sausages which are to be stored for longer than three months must typically be sterilized after stuffing. This sterilization is customarily carried out in a steam autoclave at a temperature of about 115 to 130° C. Even with sausage casings having an increased oxygen barrier, a sterilization is required, since in addition to aerobes, anaerobic microorganisms can also lead to spoilage. An ingress of atmospheric oxygen can obviously not be decreased by the sterilization.

A single-layer casing having a good water vapor and oxygen barrier may be produced from vinylidene chloride (VDC) copolymers. However, these special VDC copolymers are expensive and poorly environmentally compatible due to their chlorine content. Therefore, chlorine-free multilayer food casings have been developed which include at least one polymer layer that assures the water vapor barrier or oxygen barrier. These casings are generally produced by coextrusion. EP-A 0 467 039, for example, discloses a tubular casing which consists of an outer layer of aliphatic polyamide, a central layer of polyolefin and an adhesion promotor, and an inner layer of aliphatic and/or partly aromatic (co)polyamides. For sausage goods which are to be stored for a relatively long period, however, the oxygen barrier itself of this casing is typically not sufficient.

Biaxially oriented tubular films having an outer layer of aliphatic polyamide, a central oxygen barrier layer of an ethylene/vinyl alcohol copolymer (EVOH) or of (partly) aromatic copolyamide and an inner layer of olefinic (co) polymers are described in EP-A 0 530 539. However, the polyolefin inner layer leads to an unsatisfactory adhesion of the casing to the sausage emulsion. In order to improve this adhesion, polyolefins which are modified with polar groups can be used for the inner layer. It is also possible to blend the polyolefins with polar (co)polymers. However, all these measures have the disadvantage that they decrease the water-vapor barrier of the inner layer. A corona treatment of the olefinic inner layer likewise leads to an improved emulsion adhesion, but again this is technically very complex.

A further disadvantage of the tubular films as described in EP-A 0 530 539 is that the outer polyamide layer is water-vapor permeable, so that the central EVOH layer can absorb moisture. It is generally known that the oxygen permeation of the EVOH layer increases five hundred to one thousand times if the relative humidity increases from 0 to 100% (see J. Rellmann, H. Schenck in: Kunststoffe 82 [1992] 731). In the case of relatively long storage, in particular in a moist environment, the oxygen barrier of this casing is scarcely greater than that of a single-layer polyamide casing. If the central layer consists of a (partly) aromatic copolyamide (e.g. poly[meta-xylylene adipamide]=nylon MXD6), its oxygen barrier action is retained if the relative humidity is increased from 0 to 100%; however the barrier action is too small in any case. A layer of nylon MDX6 still allows the passage of a tenth of the oxygen volume that penetrates a corresponding layer of nylon 6. In order to prevent oxidation during storage for several months, the oxygen barrier is not sufficient.

EP-A 0 530 549 likewise discloses a three-layer casing having a central EVOH layer. The outer layer here consists of olefinic (co)polymers, while the inner layer is formed of aliphatic polyamide. This casing also does not have a long-lasting oxygen barrier when it is filled with sausage emulsion. The moisture present in abundance in the emulsion slowly migrates through the inner polyamide layer into the central EVOH layer and greatly reduces its oxygen barrier action.

In order to rectify these defects, casings having still more layers have been developed. For example, EP-A 0 603 676 describes a biaxially oriented five-layer tubular film. The layer sequence in this casing is symmetrical. Adjacent to each side of the central EVOH layer are layers of polyolefin, which are each in turn followed by one layer of aliphatic polyamide. The polyolefinic interlayers substantially protect the central layer from moisture. However, the protective action of the interlayers is generally not sufficient against the superheated steam used during the sterilization (see B. C. Tsai and J. A. Wachtel in ACS Symp. Ser. 423 [1990] 198). Although, after the sterilization, the moisture slowly diffuses again out of the casing, a residual moisture remains in the central layer, which greatly reduces the oxygen barrier.

To date, there is no chlorine-free polymer-based tubular food casing which has a high oxygen barrier which remains under all conditions of practice.

SUMMARY OF THE INVENTION

An object of the invention is therefore to provide a food casing having a high water-vapor and oxygen barrier which may be sterilized using superheated steam, without substantially increasing the oxygen permeability.

It is also an object of the present invention to provide casings that are free of chlorine-containing polymers, such as VDC, which have the desired barrier properties.

It is also an object of the invention to provide methods of making and using such casings.

In accordance with these and other objectives, there is provided by the present invention a tubular biaxially-oriented food casing including (a) an outer layer comprising a mixture of (i) at least one aliphatic (co)polyamide and (ii) at least one partly aromatic (co)polyamide, (b) a first intermediate layer comprising an ethylene/vinyl alcohol copolymer, (c) a second intermediate layer comprising an olefinic polymer or olefinic copolymer, (d) an inner layer which comprises an aliphatic (co)polyamide.

In accordance with these and other objectives, there is provided by the present invention a process for producing a food casing described above including (a) extruding the individual layers through an annular coextrusion die to form a multilayer primary tube, (b) cooling and solidifying the primary tube, (c) heating the primary tube to a temperature required for orientation, (d) orienting the primary tube in the longitudinal and transverse direction at said temperature and, optionally, (e) heat-setting the oriented tube.

Further objects, features, and advantages of the present invention will become apparent from the detailed description of preferred embodiments that follows.

DETAILED DESCRIPTION OF THE PREFERRED EMBODIMENTS

The invention is directed to an at least four-layer tubular biaxially oriented food casing having (a) an outer layer which preferably essentially consists of a mixture of at least one aliphatic and at least one partly aromatic (co)polyamide with or without pigments, and (d) an inner layer which preferably essentially consists of aliphatic (co)polyamide, wherein, between these layers, there is provided (b) a layer of an ethylene/vinyl alcohol copolymer or a blend of the ethylene/vinyl alcohol copolymer with an aliphatic or partly aromatic (co)polyamide and/or with an olefinic (co)polymer and/or an ionomer resin and (c) a layer which preferably essentially consists of an olefinic (co)polymer with or without adhesion promoters, pigments and/or UV absorbers. Layers (b) and (c) can be arranged in any order between layers (a) and (d). Also, layer (b) and/or (c) can be present more than once. For example, layer (c) can be present multiple times, in particular twice, in the casing.

The contents of aliphatic (co)polyamide and partly aromatic (co)polyamide in the outer layer can be selected to give desired effects. The content of aliphatic (co)polyamide is preferably 40 to 95% by weight, particularly preferably 60 to 90% by weight, in each case based on the total weight of the outer layer. The content of the partly aromatic (co)polyamide in layer (a) is preferably 5 to 60% by weight, particularly preferably 10 to 40% by weight.

Any desired aliphatic and partly aromatic (co)polyamide or mixture thereof can be used. Preferred aliphatic (co)polyamides include nylon 6 and nylon 6/66. The term "(co)polyamide" means polyamide (such as nylon 6) and/or copolyamide (such as nylon 6/66). Preferred partly aromatic (co)polyamides include poly(meta-xylylene adipamide) (MXD6) and nylon 6I/6T. Particularly preferably, the outer layer consists of a blend of 60 to 90% by weight of nylon 6 and/or nylon 6/66 and 40 to 10% by weight of nylon-MXD6. The content of partly aromatic (co)polyamide markedly decreases the oxygen permeability of the outer layer. The oxygen permeability decreases still further even if the casing is exposed to moisture or is sterilized with superheated steam.

The outer layer (a) can, in addition, further comprise effective amounts of conventional additives, in particular pigments. The layer may be colored by the pigments. Pigments can also decrease the tendency to blocking. They may be present in an amount of preferably no more than 5% by weight, relative to the total weight of the layer (a). The thickness of the outer layer can be selected as desired and is generally 12 to 30 µm, preferably 15 to 25 µm.

The ethylene/vinyl alcohol copolymer (EVOH) of the central layer (b) can be any derived EVOH polymer, and preferably consists of 29 to 47 mol % ethylene units and 71 to 53 mol % vinyl alcohol units. The layer (b) can have any desired amount of EVOH, such as to 30 to 90% by weight of EVOH. The layer (b) preferably comprises 70 to 10% by weight of at least one aliphatic and/or one partly aromatic (co)polyamide. Suitable copolyamides include, for example, nylon 6/69, nylon 6/12, and nylon 6I/6T.

Layer (b) can also contain olefinic polymers or copolymers. Suitable olefinic copolymers are, for example, ethylene/acrylic acid or ethylene/methacrylic acid copolymers. If the hydrogen atoms in a greater or lesser proportion of the carboxyl groups of these copolymers are replaced by metal cations (for example, $Na^+$ or $½ Zn^{2+}$), suitable ionomer resins are attained which are also useful in layer (b). The olefinic (co)polymers may be present in an amount of up to 30% by weight, relative to the total weight of the layer (b). Conventional additives, such as stabilizers for the EVOH or pigments may further be present in minor amounts.

The use of EVOH gives the layer (b) a high oxygen-barrier action. The (co)polyamides and/or olefinic (co)polymers which can be used do not significantly decrease the oxygen barrier properties of the layer, and in addition cause an improved suppleness of the layer. A layer of pure EVOH, in contrast, is relatively stiff, even stiffer than that of the layers (a), (c) and (d). Thus an EVOH having a content of 32 mol % of ethylene units has a tensile modulus of elasticity of about 3800 $N/mm^2$, while moist nylon 6 has a tensile modulus of elasticity of about 700, and gives much less resistance to mechanical extension. Improved suppleness of the layer (b) leads to the casing being extensible, and thus, enabling it to be stuffed more readily. At the same time, increased suppleness ensures that during stuffing or scalding of the emulsion no cracks form in the layer. Such cracks would greatly impair the barrier action. The layer (b) has any desired thickness and generally has a thickness of 3 to 15 µm, preferably 6 to 12 µm.

The polyolefinic layer (c) may include any desired olefin polymer or copolymer and preferably consists of polyethylene, ethylene-α-olefin copolymers, polypropylene, and/or ethylene/propylene copolymers. The polyolefins can be modified by functional groups, such as carboxy groups, carboxylic acid anhydride groups, aliphatic ester groups, carboxylic acid salt groups or hydroxy groups. They then have an adhesive effect between EVOH of layer (b) and polyamide or layer (a) and/or (d). The same adhesion effect is achieved if an adhesion promotor is mixed with the polyolefins. The adhesion promotors are generally organic polymers. Preferably, the olefin (co)polymer is present in an amount of from 40 to 100% by weight, whereas the adhesion promotor is present in an amount of up to 60% by weight, in each case relative to the total weight of the layer (c). The adhesion promoters can therefore also optionally form a separate layer on one or both sides of the polyolefinic layer (c).

The layer (c) can, in addition, further contain color pigments and/or organic or inorganic UV absorbers in amounts effective to give the intended effect. Layers (b) and (c) may be arranged in any manner between layer (a) and (d). If only one layer (c) is present, it is generally arranged between the layers (b) and (d). If two layers (c) are present, one is generally present between the layer (b) and the outer layer (a), and one between the layer (b) and the inner layer (d). In the case of a five-layer casing, the sequence of the individual layers is preferably (a)–(c)–(b)–(c)–(d).

The thickness of the olefinic layer(s) (c) is generally 5 to 20 µm, preferably 8 to 12 µm. If more than one layer (c) is used, they may be the same or different with respect to their properties and compositions.

Any aliphatic (co)polyamide can be used for inner layer (d). Suitable aliphatic polyamides for the inner layer (d) include for example, nylon 6/69. The thickness of the layer (d) can be selected as desired and is generally 4 to 15 µm, preferably 5 to 10 µm. Layer (d) optionally comprises conventional additives, such as stabilizers or antiblocking pigments.

The water-vapor transmission rate of the multilayer casing is in general in the range of from 2 to 20 $g/m^2$ d (determined in accordance with DIN 53 122); likewise, the oxygen gas transmission rate is in general in the range of from 0.5 to 10 cm$^3$/m$^2$ d bar (DIN 53 380).

The food casings according to the invention can be produced by known processes. A particularly suitable process comprises the steps of:

extruding the individual layer through an annular coextrusion die to form a multilayer primary tube, cooling and solidifying the primary tube, heating the primary tube to a temperature required for orientation, orienting the primary tube in the longitudinal and transverse direction at this temperature and, if appropriate, heat-setting the oriented tube.

In this process, the starting materials for the individual layers are first melted and plastified in different extruders. The individual polymer melts are then fed to an annular coextrusion die. The so-called primary tube resulting from the extrusion is then solidified under intensive cooling. It is then reheated to a temperature required for orientation. The orientation itself is generally performed by using a pressurized gas (e.g., air) in the interior of the tube. In the machine direction (=longitudinal direction), the extension can be reinforced by suitably set roll pairs. The oriented tube is then customarily further heat-set. The heat setting typically improves the dimensional stability of the tube.

The food casing according to the invention can be used as desired, in particular as synthetic sausage casing, especially for cooked-meat sausages and scalded-emulsion sausages which are required to keep over long storage times, and in addition, for example, for packaging cheese or animal feed.

The examples below illustrate the invention, without limiting it. Data on the composition of the individual layers are in percent by weight.

The water vapor permeability was determined as specified in DIN 53122 by gravimetry at an H$_2$O partial pressure difference of 85% to 0% and a temperature of 23° C.

The oxygen permeability was determined as specified in DIN 53380 using an Oxtran® 10 instrument from Mocon at 53% relative humidity and 23° C.

The sausage casings were also tested under environmental conditions in which they are generally used. For this purpose, the casings were soaked in water in sections for 30 minutes and then stuffed with fine-grained calf liver sausage emulsion. The sausages were then scalded and sterilized in a counterpressure steam autoclave for 60 minutes at a temperature of 115° C. After cooling, they were stored in a cold room at 6° C. for a time period specified in the table below. At the end of the storage time, the sausages were sliced. A part of the casing was carefully taken off and the color of the emulsion surface was evaluated in comparison with a freshly stuffed sausage.

EXAMPLE 1

A four-layer primary tube was produced by coextrusion, having (a) an outer layer of 70% nylon 6/66 (Ultramid® C4, BASF AG), blended with 30% of nylon MXD6 (nylon MX 6007 of Mitsubishi Gas Chem.)

(b) a central layer of 80% of an ethylene/vinyl alcohol copolymer containing 32 mol % ethylene units and 68 mol % vinyl alcohol units (Soarnol® DC of Nippon Gohsei), blended with 20% polyamide 6/69 (Grilon® CF62BS, Ems-Chemie), (c) a central layer of maleic-anhydride-grafted low density linear polyethylene (grafted LLDPE=Escor® CTR 2000 from Exxon Ltd.) and (d) an inner layer of nylon 6/66 (Ultramid® C4 of BASF AG).

The primary tube was rapidly cooled to about 15° C., then heated to about 90° C. and biaxially oriented at this temperature. The area drawing ratio was 9.1:1. Heatsetting followed, in which the tube was initially squeezed flat air-tightly by a roller pair, then reinflated, passed through a heating chamber and finally squeezed flat again. The diameter of the heat-set tube was 45 mm, with a wall thickness of 45 µm. The layer (a) made up 25 µm thereof, the layer (b) 7 µm, the layer (c) 8 µm and the layer (d) 5 µm. The properties of the tube are summarized in the table that follows.

EXAMPLE 2

As described in Example 1, a biaxially oriented heat-set four-layer tube having a diameter of 45 mm and a wall thickness of 50 µm was produced.

The outer layer (a) consisted of 60% nylon 6/66, 30% nylon MXD6 and 10% nylon 6I/6T (Selar® PA 3426 from DuPont) and had a thickness of 25 µm. The central layer (b) consisted of 50% of the ethylene/vinyl alcohol copolymer mentioned in Example 1, blended with 50% of the nylon 6/69 likewise mentioned in Example 1, and had a thickness of 12 µm. The olefinic layer (c), and also the inner polyamide layer (d) had the same thickness and consisted of the same material as the layers (c) and (d) in Example 1.

EXAMPLE 3

In a similar manner to Example 1, a biaxially oriented, heat-set, five-layer tube having a diameter of 45 mm and a wall thickness of 50 m was produced. The outer layer (a), the olefinic layer (c) and also the inner polyamide layer (d) had in this case the same composition and thickness as the layers (a), (c) and (d) in Example 2. The layer (b) in turn, had the same composition and thickness as the layer (b) in Example 1.

Between the outer polyamide layer (a) and the central layer (b), however, lay, in addition, a further olefinic layer (c) of the same composition as the first layer (c), but this had a thickness of only 5 µm.

COMPARISON EXAMPLE V1

As described in Example 1, a biaxially oriented heat-set four-layer tubular casing having a diameter of 45 mm and a wall thickness of 45 µm was produced. The polyolefinic layer (c) and the inner polyamide layer (d) had the same composition and thickness as the layer (c) and (d) in Example 1. The outer polyamide layer (a), however, consisted solely of nylon 6/66 (Ultramid® C4 from BASF AG); its thickness was 25 µm. The layer (b) arranged between the layers (a) and (c) consisted of the ethylene/vinyl alcohol copolymer as described in Example 1 and had a thickness of 7µm.

COMPARISON EXAMPLE V2

In similar manner to Example 1, a biaxially oriented heat-set three-layer tubular casing having a diameter of 45 mm and a wall thickness of 45 µm was produced. The outer and inner layers each consisted of nylon 6/66 and had a thickness of 30 µm and 5 µm, respectively. The central layer consisted of the grafted polyethylene mentioned in Example 1 and had a thickness of 10 µm.

The properties of the casings of the Examples are shown in the following table:

TABLE

| Example | Water-vapor permeability (g/m² day) | Oxygen permeability (cm³/m² day bar) | Visual rating of the color of the emulsion surface after | |
|---|---|---|---|---|
| | | | 4 weeks | 12 weeks |
| 1 | 4.7 | 5.3 | 0 | 0 |
| 2 | 4.6 | 5.1 | 0 | 0 |
| 3 | 3.2 | 3.2 | 0 | 0 |
| V1 | 4.8 | 0.9 | 1 | 1 |
| V2 | 3.8 | 15.3 | 1 | 2 |

In the rating of the color of the emulsion surface after the respective storage times, the values denote the following:

0=No observable gray discoloration

1=Slight gray discoloration

2=Severe gray discoloration

German Application 19721142.9, filed May 21, 1997, the priority application of the present invention is hereby incorporated by reference in its entirety.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A tubular biaxially-oriented food casing comprising:
   (a) an outer layer comprising a mixture of (i) at least one aliphatic (co)polyamide, and (ii) at least one partially aromatic (co)polyamide;
   (b) a first intermediate layer comprising an ethylene/vinyl alcohol copolymer and additionally one or more of an aliphatic (co)polyamide, a partly aromatic (co)polyamide, an olefinic polymer, an olefinic copolymer, or an ionomer resin;
   (c) a second intermediate layer comprising an olefinic polymer or olefinic copolymer; and
   (d) an inner layer which comprises an aliphatic (co)polyamide.

2. A food casing according to claim 1, wherein the outer layer (a) comprises one or more pigments.

3. A food casing according to claim 1, wherein the second intermediate layer (c) additionally comprises one or more of an adhesion promotor, a pigment, or a UV absorber.

4. A food casing according to claim 1, wherein the content of aliphatic (co)polyamide in the outer layer (a) is 40 to 95% by weight, based on the total weight of the outer layer (a).

5. A food casing according to claim 1, wherein the thickness of the outer layer (a) is 12 to 30 μm.

6. A food casing according to claim 1, wherein the ethylene/vinyl alcohol copolymer of layer (b) comprises 29 to 47 mol % of ethylene units and 71 to 53 mol % of vinyl alcohol units.

7. A food casing according to claim 1, wherein the layer (b) comprises 30 to 90% by weight of at least one ethylene/vinyl alcohol copolymer, and 70 to 10% by weight of at least one aliphatic (co)polyamide or at least one partly aromatic (co)polyamide, based on the total weight of layer (b).

8. A food casing according to claim 1, wherein the thickness of the layer (b) is 3 to 15 μm.

9. A food casing according to claim 1, wherein the olefin polymer or copolymer of layer (c) comprises one or more of polyethylene, polypropylene, or ethylene/propylene copolymers.

10. A food casing according to claim 1, wherein the thickness of layer (c) is 5 to 20 μm.

11. A food casing according to claim 1, wherein the thickness of the inner layer (d) is 4 to 15 μm.

12. A food casing according to claim 1, wherein a first layer (c) is in between the layer (b) and the outer layer (a) and another layer (c), which may be the same or different from the first layer (c), is between the layer (b) and the inner layer (d).

13. A food casing according to claim 1, which is heat-set.

14. A process for producing a food casing according to claim 1, comprising
   (a) extruding the individual layers (a), (b), (c), and (d) through an annular coextrusion die to form a multilayer primary tube;
   (b) cooling and solidifying the primary tube;
   (c) heating the primary tube to a temperature required for orientation;
   (d) orienting the primary tube in the longitudinal and transverse direction at said temperature and, optionally;
   (e) heat-setting the oriented tube.

15. A synthetic sausage casing comprising a food casing according to claim 1.

16. Cheese packaging comprising a food casing according to claim 1.

17. Animal feed packaging comprising a food casing according to claim 1.

18. A food casing according to claim 1, wherein outer layer (a) consists essentially of a mixture of (i) at least one aliphatic (co)polyamide and (ii) at least one partly aromatic (co)polyamide, layer (d) consists essentially of said aliphatic (co)polyamide, and layer (c) consists essentially of said olefinic polymer or copolymer.

19. A food casing according to claim 1, wherein the olefinic polymer or copolymer of layer (c) includes functional groups which improve the adhesion of the ethylene/vinyl alcohol copolymer of layer (b) to the polyamide of layer (d).

20. A food casing according to claim 12, wherein the olefinic polymer or copolymer of layer (c) includes functional groups which improve the adhesion of the ethylene/vinyl alcohol copolymer of layer (b) to the polyamide of layer (a) and the inner layer (d).

* * * * *